United States Patent [19]

Reynolds

[11] Patent Number: 5,716,277
[45] Date of Patent: Feb. 10, 1998

[54] SEAL FOR A UNIVERSAL JOINT TRUNNION

[75] Inventor: James T. Reynolds, Toledo, Ohio

[73] Assignee: Dana Corporation, Toledo, Ohio

[21] Appl. No.: 660,914

[22] Filed: Jun. 10, 1996

[51] Int. Cl.$^6$ ..................................... F16D 3/16
[52] U.S. Cl. ................ 464/131; 464/11; 277/208
[58] Field of Search ......................... 464/128, 131, 464/136, 11, 14; 277/152, 208

[56] References Cited

U.S. PATENT DOCUMENTS

| | | | |
|---|---|---|---|
| 3,200,615 | 8/1965 | Stokely | 464/14 |
| 3,203,511 | 8/1965 | Long, Jr. | 277/208 |
| 3,207,521 | 9/1965 | Dega | 277/208 |
| 3,848,938 | 11/1974 | Stella et al. | |
| 3,955,859 | 5/1976 | Stella et al. | |
| 4,512,672 | 4/1985 | Olschewski et al. | 277/152 X |
| 4,515,574 | 5/1985 | Mazziotti | |
| 4,530,675 | 7/1985 | Mazziotti | 464/131 |
| 4,592,556 | 6/1986 | Nieman et al. | |
| 4,645,474 | 2/1987 | Olschewski et al. | 464/131 |
| 4,861,315 | 8/1989 | Mazziotti | 464/131 |
| 4,874,349 | 10/1989 | Gall | |
| 4,903,971 | 2/1990 | Bauer | 277/152 |
| 4,943,262 | 7/1990 | Schultze | 464/131 |
| 5,186,548 | 2/1993 | Sink | |
| 5,407,387 | 4/1995 | Mazziotti et al. | 464/131 |

FOREIGN PATENT DOCUMENTS

| | | | |
|---|---|---|---|
| 3605746 | 8/1987 | Germany | 464/128 |
| 1290006 | 9/1972 | United Kingdom | 464/14 |

*Primary Examiner*—John P. Darling
*Assistant Examiner*—William A. Rivera
*Attorney, Agent, or Firm*—MacMillan, Sobanski & Todd

[57] ABSTRACT

An elastomeric seal assembly for use with a bearing cup mounted on a trunnion of a universal joint cross member includes an elastomeric seal attached to a metallic support ring. The metallic rings are pressed into the open ends of the bearing cups and are retained therein by friction. The elastomeric seals each include first, second and third radially inwardly extending sealing lips. When the bearing cups and sealing assemblies are mounted about the trunnions the annular lubricant sealing lip engages the frustoconical sealing surface of the trunnion. The annular lubricant sealing lip is slanted towards the closed end of the cup to prevent lubricant from flowing past the seal and out of the roller bearing region. The second sealing lip engages the cylindrical sealing surface of the trunnion and is slanted towards the open end of the cup to resist the entry of abrasive contaminants into the roller bearing region. A third sealing lip engages the cylindrical sealing surface of the trunnion and is slanted in the same direction as the first contaminant sealing lip. The second contaminant sealing lip resists the movement of contaminants towards the first contaminant sealing lip thereby prolonging the life of the seal and universal joint.

20 Claims, 4 Drawing Sheets

SEAL FOR A UNIVERSAL JOINT TRUNNION

BACKGROUND OF THE INVENTION

This invention relates in general to universal joints and in particular to an improved seal for use with a bearing cup mounted on a trunnion of a universal joint cross member.

Universal joints are structures which are well known in the art. Such joints usually include a cross member having a central body portion with four trunnions extending outwardly therefrom. The trunnions extend at right angles relative to one another and lie in a single plane. A central bore is provided in each trunnion forming an opening in the end of the trunnion opposite the central body portion. A hollow cylindrical bearing cup, closed at one end, is disposed over the open end of each of the trunnions. Roller bearings are provided between each of the bearing cups and its associated trunnion such that the bearing cups are rotatably mounted thereon. During assembly, lubricant is placed in the central bore in each trunnion. During operation of the universal joint, centrifugal forces move the lubricant outwardly from the trunnion bore towards the closed ends of the bearing cups. The lubricant passes around the outer ends of the trunnions adjacent the closed ends of the bearing cups and radially inwardly back between the bearing cups and the trunnions where the roller bearings are disposed. In this manner, the roller bearings are lubricated for use.

It is known to provide the open ends of the bearing cups with elastomeric seals. The elastomeric seal is typically positioned between the trunnion and bearing cup to form a seal therebetween. To provide an effective seal, such seals must resist the entry of contaminants into the bearing cup and restrict the flow of lubricant out of the region of the bearing cup where the roller bearings are located. One commonly known seal, the lip seal, can accomplish both tasks. The lip seal includes an annular body which seals against a first surface of the universal joint assembly and one or more annular lips extending from the body to contact a second surface to be sealed. A conventional lip seal has two lips. A first lip is provided to prevent the flow of lubricant out of the interior of the bearing cup where the roller bearings are located. A second lip is provided to resist the entry of exterior contaminants into that same interior region of the bearing cup.

To provide an effective seal, the two lips of the lip seal can be angled in opposite directions. For example, the first lip (which is used to prevent lubricant from flowing out of the interior of the bearing cup) extends from the seal body toward the sealing surface of the trunnion and is angled outwardly toward both the roller bearing region and the closed end of the bearing cup. The second lip (which is used to resist the entry of exterior contaminants into the interior of the bearing cup) also extends from the seal body toward the sealing surface of the trunnion and is angled inwardly toward the central body portion of the cross member and the open end of the bearing cup.

It has been found that the second lip (the contaminant sealing lip) may begin to wear when contaminants become trapped between it and the sealing surface of the trunnion. Such wear is undesirable as it can allow contaminants to move past the seal into the interior of the bearing cup where the roller bearings are located. The first lip (the lubricant retaining lip) does not effectively resist the entry of contaminants into the roller bearing region because it extends outwardly toward the closed end of the bearing cup, in the same direction as the undesired contaminants. Therefore, when the contaminants move past the contaminant sealing lip, they can easily move past the lubricant retaining lip into the roller bearing region. Thus, it would be desirable to provide an improved structure for an elastomeric seal which more effectively resists the entry of contaminants into the roller bearing region, thereby prolonging the life of the universal joint assembly.

SUMMARY OF THE INVENTION

This invention relates to an improved structure for an elastomeric seal for use with a bearing cup mounted on a trunnion of a universal joint cross member. The cross member includes a central body portion having a plurality of trunnions extending axially outwardly therefrom. Each of the trunnions includes a relatively short cylindrical friction surface extending axially outwardly from the body portion, a relatively short radially inwardly-extending frustoconical surface extending axially outwardly from the friction surface, a cylindrical sealing surface extending axially outwardly from the frustoconical surface, a frustoconical sealing surface extending axially outwardly from the cylindrical sealing surface, and a relatively long cylindrical bearing surface extending axially outwardly from the sealing surface. A bearing cup, having an open end and a closed end, is rotatably mounted on the bearing surfaces of each of the trunnions by a plurality of roller bearings. An annular seal assembly is provided for sealing each of the bearing cups on its associated trunnion. Each of the seal assemblies includes an elastomeric seal attached to a metallic support ring. The metallic rings are pressed into the open ends of the bearing cups and are retained therein by friction. Each of the elastomeric seals has three radially inwardly-extending annular sealing lips which engage the frustoconical sealing surfaces of the trunnions. The first lip is an annular lubricant sealing lip which is slanted outwardly toward the closed end of the cup to prevent lubricant from flowing out of the roller bearing region. The second lip is a first annular contaminant sealing lip which engage the cylindrical sealing surface of the trunnion and is slanted inwardly toward the open end of the cup to resist the entry of abrasive contaminants into the roller bearing region. The third lip is a second annular contaminant sealing lip engages the cylindrical sealing surface of the trunnion and is also slanted inwardly toward the open end of the cup. The second contaminant sealing lip resists the movement of contaminants towards the first contaminant sealing lip, thereby prolonging the life of the elastomeric seal and, therefore, the universal joint assembly as a whole.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
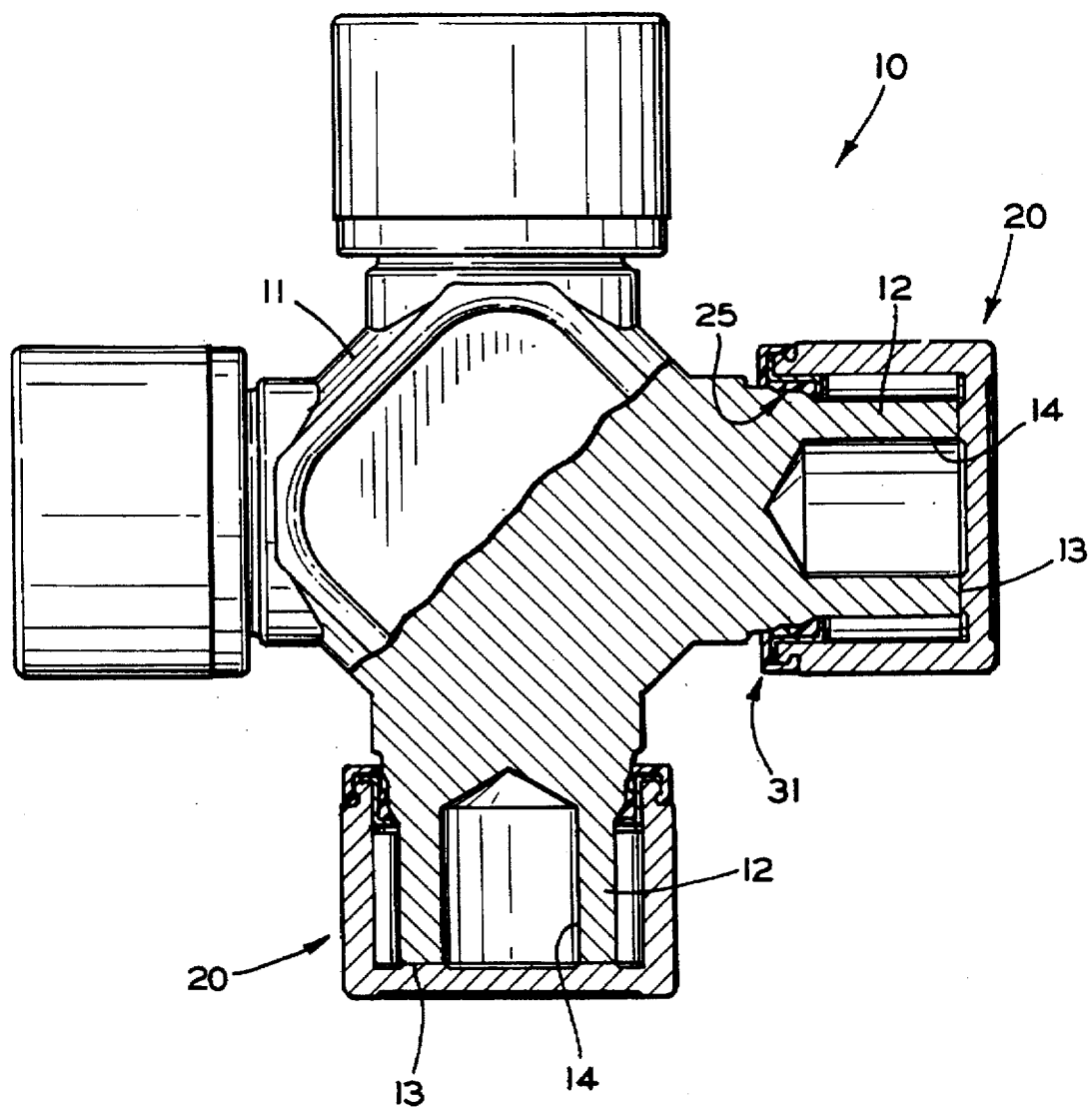
FIG. 1 is an elevational view, partially in cross section, of a cross member for a universal joint assembly in accordance with this invention.
Figure 2:
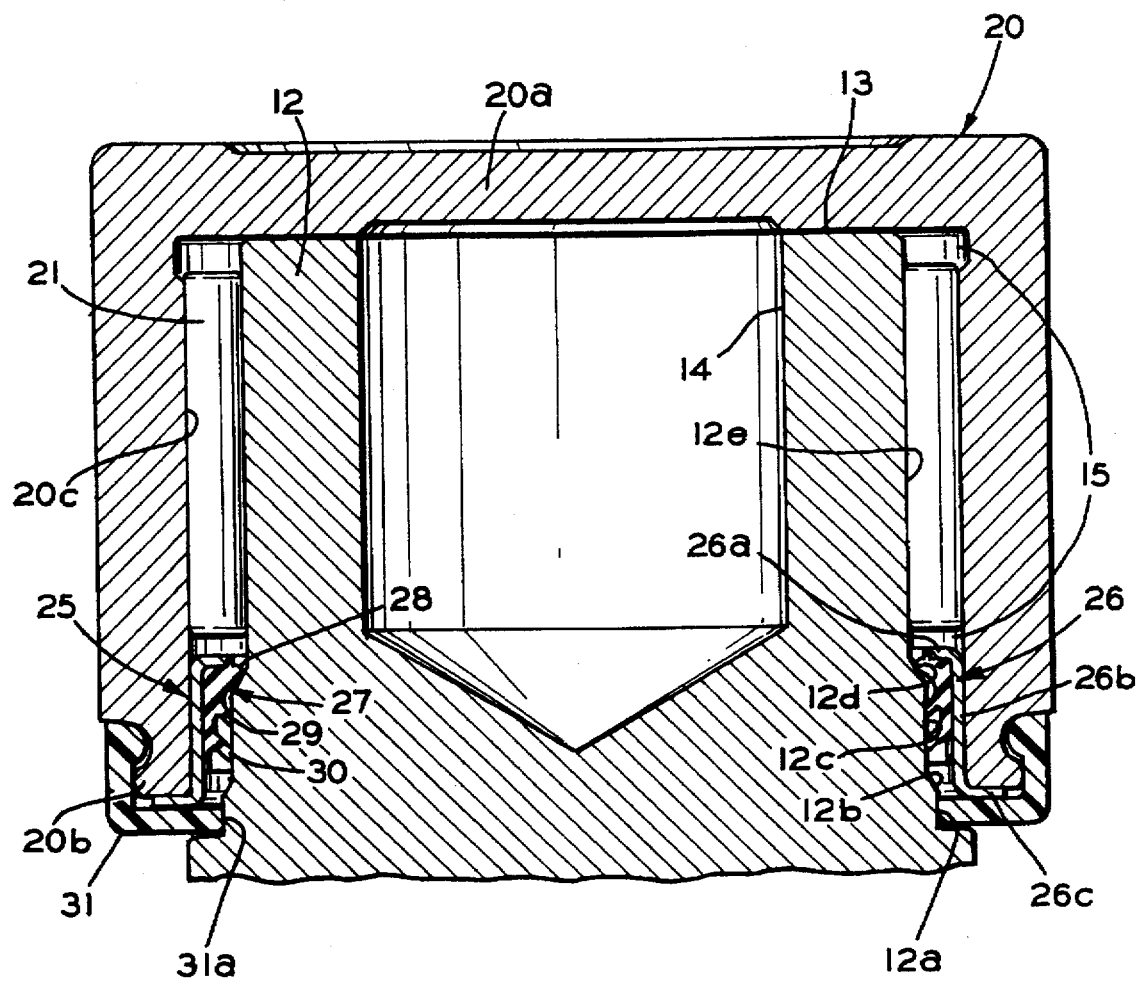
FIG. 2 is an enlarged sectional elevational view of a portion of one of the trunnions illustrated in FIG. 1 including a bearing cup and a first embodiment of a lip seal in accordance with this invention.
Figure 3:
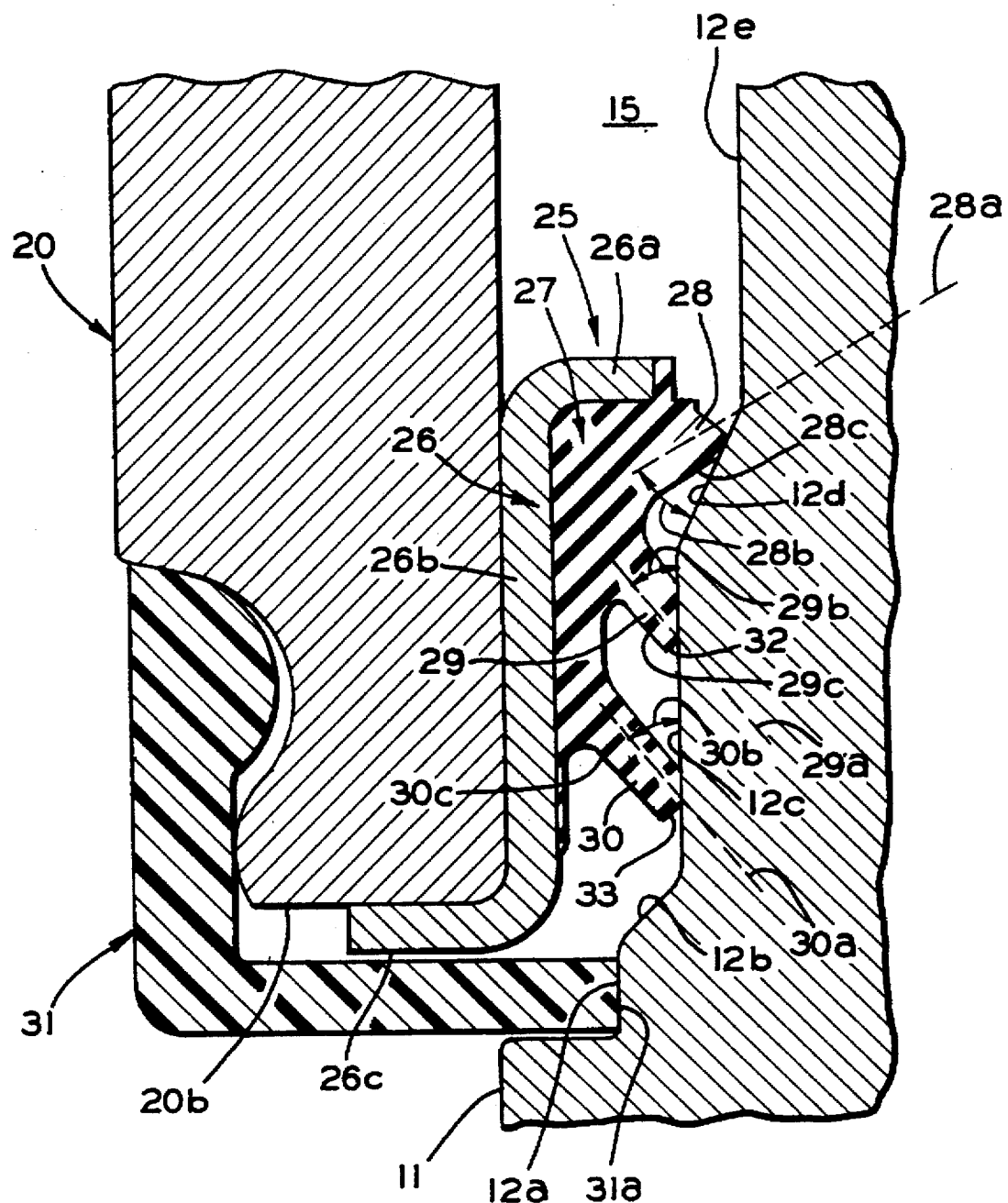
FIG. 3 is a further enlarged sectional elevational view of a portion of the trunnion, bearing cup, and lip seal illustrated in FIG. 2, wherein the roller bearing has been omitted for clarity.

Referring now to the drawings, there is illustrated in FIGS. 1 through 3 a cross member, indicated generally at 10, which is adapted for use in a conventional universal joint assembly (not shown). The cross member 10 includes a central body portion 11 having a plurality of trunnions, indicated generally at 12, extending axially outwardly therefrom. In the illustrated embodiment, four of such trunnions 12 are formed integrally with the body portion 11. The trunnions 12 are disposed at right angles relative to one another and are oriented so as to lie in a single plane. Each of the trunnions 12 is generally cylindrical in shape, terminating in an end 13. A bore 14 is formed co-axially through each of the trunnions 12 for a purpose which will be explained below.

Each of the trunnions 12 includes a cylindrical friction surface 12a extending axially outwardly from the body portion 11, a frustoconical surface 12b extending axially outwardly from the friction surface 12a, a cylindrical sealing surface 12c extending axially outwardly from the frustoconical surface 12b, a frustoconical sealing surface 12d extending outwardly from the cylindrical sealing surface 12c, and a cylindrical outer bearing surface 12e extending axially outwardly from the frustoconical sealing surface 12d. The outer bearing surfaces 12e terminate at the ends 13 of the trunnions 12, as discussed above. The outer diameters of the cylindrical surfaces 12a, 12c, and 12e are successively smaller, as shown in the drawings. Thus, as best shown in FIG. 2, the cylindrical friction surface 12a of the trunnion 12 has a slightly larger outer diameter than the outer bearing surface 12e and is formed co-axially therewith. The frustoconical surface 12b and frustoconical sealing surface 12d decrease in diameter as they extend axially outwardly from the cylindrical friction surface 12a and the cylindrical sealing surface 12c, respectively.

A bearing cup, indicated generally at 20, is mounted about each of the outer bearing surfaces 12e of the trunnions 12. Each of the bearing cups 20 is generally hollow and cylindrical in shape, having a closed end 20a, an open end 20b, and a smooth inner bearing surface 20c. When mounted about the trunnions 12, the closed ends 20a of the bearing cups 20 are disposed adjacent to the open ends 13 of the trunnions 12, while the inner bearing surfaces 20c of the bearing cups 20 are disposed co-axially about the outer bearing surfaces 12e of the trunnions 12.

The diameters of the inner bearing surfaces 20c of the bearing cups 20 are larger than the diameters of the outer bearing surfaces 12e of the trunnions 12. Respective pluralities of conventional roller bearings 21 (only two are illustrated) are disposed in an annular space 15 defined between the bearing surfaces 20c and 12e in a known manner. The roller bearings 21 are oriented coaxially with the cylindrical trunnions 12 and are arranged in a circumferential array thereabout. The roller bearings 21 permit the bearing cups 20 to rotate about the trunnions 12.

An annular seal assembly, indicated generally at 25, is provided about the open end 20b of the bearing cup 20, extending between the inner bearing surface 20c thereof and the trunnion 12. As best shown in FIG. 3, each of the seal assemblies 25 includes a metallic support ring 26 and an elastomeric seal 27. The support ring 26 is generally S-shaped in cross section, having a radially inwardly extending portion 26a, a cylindrical central portion 26b, and a radially outwardly extending portion 26c. The central portions 26b is formed having an outer diameter which is approximately equal to the inner diameter of the inner bearing surface 20c of the bearing cup 20. Thus, the support ring 26 can be pressed into the inner bearing surface 20c and retained within the bearing cup 20 by friction.

Referring to FIGS. 2 and 3, the elastomeric seals 27 are disposed within the support tings 26 and are attached thereto by any conventional means, such as by adhesive bonding. Each of the elastomeric seals 27 includes a first lip, which in the illustrated embodiment is an annular lubricant sealing lip 28 positioned near the radially inwardly extending portion 26a of the support ring 26. The annular lubricant sealing lip 28 extends radially inwardly and is provided to sealingly engage the frustoconical sealing surface 12d of the trunnion 12 when the bearing cup 20 and sealing assembly 25 are mounted thereabout. The annular lubricant sealing lip 28 is generally oriented along a line 28a which forms an acute angle 28b with the frustoconical portion 12d when the bearing cup 20 and sealing assembly 25 are mounted about the trunnion 12. As the lubricant sealing lip 28 extends towards the frustoconical portion 12d, its direction of orientation along line 28a is opposite the direction of flow of lubricant flowing out of the bearing region 15 toward the open end of the bearing cup 20b. In other words, the lubricant sealing lip 28 is slanted to extend axially outwardly from the body portion 11 of the cross member 10. This direction of orientation allows the lubricant sealing lip 28 to resist the flow of lubricant out of the bearing region 15 toward the open end of the bearing cup 20b. The lubricant sealing lip 28 has a slanted surface 28c which is generally parallel to the line of orientation 28a.

The elastomeric seal 27 also includes a second lip and a third lip, which in the illustrated embodiment are first and second annular contaminant sealing lips 29 and 30. The first and second contaminant sealing lips 29 and 30 are located between the annular lubricant sealing lip 28 and the radially outwardly extending portion 26c of the support ring 26. The annular contaminant sealing lips 29 and 30 extend radially inwardly from the central portion of the sealing ring 26 and are provided to sealingly engage the cylindrical sealing surface 12c of the trunnion 12 when the bearing cup 20 is mounted thereabout. The contaminant sealing lips 29 and 30 are generally oriented along lines 29a and 30a, respectively, which form acute angles 29b and 30b with the cylindrical sealing surface 12c. The acute angles 29b and 30b are illustrated as being the same, but such is not necessary. As the contaminant sealing lips 29 and 30 extend towards the cylindrical sealing surface 12c, their direction of orientation along lines 29a and 30a is opposite the direction of flow of contaminants moving into the bearing region 15 from the open end of the bearing cup 20b. In other words, the contaminant sealing lips 29 and 30 are slanted to extend axially inwardly toward the body portion 11 of the cross member 10. This direction of orientation allows the contaminant sealing lips 29 and 30 to resist the movement of contaminants from outside the bearing cup 20 into the bearing region 15. The first and second contaminant lips 29 and 30 have respective slant surfaces 29c and 30c which are generally parallel to the lines of orientation 29a and 30a. The first and second annular contaminant sealing lips 29 and 30 terminate in ends 32 and 33 respectively. The inner annular diameters defined by the ends 32 and 33 of the first and second contaminant sealing lips 29 and 30 are approximately equal.

An annular dust guard, indicated generally at 31, is removably secured with a loose fit about the open end 20b of each of the bearing cups 20. The dust guards 31 are preferably formed from a relatively stiff, but somewhat flexible, plastic material, such as nylon or other suitable material. The dust guard 31 has is a flat inner friction surface 31a which abuts the outer friction surface 12a of the trunnion 12. The inner diameter of the inner friction surface 31a of the dust guard 31 is slightly smaller than the outer diameter of the outer friction surface 12a of the trunnion 12 formed adjacent to the body portion 11. Thus, the dust guard 31 is frictionally retained on the trunnion 12.

Before installing the seal assemblies 25 and the dust guards 31, the roller bearings 21 are initially assembled into the bearing cups 20 in a conventional manner. The seal assemblies 25 are next pressed into frictional engagement with the inner bearing surfaces 20c of the bearing cups 20. The dust guards 31 are then pushed onto the open ends 20b of the bearing cups 20 and retained thereon. The dust guards 31 may be removed from the bearing cups 20 after being installed thereon simply by prying them off. The bearing cups 20 and dust guards 31 are next assembled onto the trunnions 12 by inserting the open ends 20b of the bearing cups 20 over the open ends 13 of the trunnions 12. The bearing cups 20 are then moved axially inwardly toward the body portion 11. Little frictional resistance is generated to such movement because the inner diameters of the friction surface 31a of the dust guards 31 are larger than the outer diameters of both the outer bearing surfaces 12d and the cylindrical sealing surfaces 12c of the trunnions 12.

The axial movements of the bearing cups 20 are continued until the inner frictional surfaces 31a of the dust guards 31 engage the outer frictional surfaces 12a of the trunnions 12. At this point, additional force must be applied to overcome the interference fit between the dust guards 31 and the trunnions 12 and to continue the inward movement of the bearing cups 20. Such additional force causes the inner frictional surfaces 3a to slide over the outer frictional surfaces 12a. The inward movement of the bearing cups 20 is continued until closed ends 20a abut the open ends 13 of the trunnion 12, as shown in the drawings. At that point, the annular lubricant sealing lips 28 sealingly engage is the frustoconical sealing surfaces 12d, and the first and second contaminant sealing lips 29, 30 sealingly engage the cylindrical sealing surfaces 12c.

Because of the frictional engagement caused by the interference fit between the inner frictional surfaces 3a and the outer frictional surfaces 12a, the dust guards 31 are frictionally retained on the trunnions 12. Consequently, the bearing cups 20 are retained on the trunnions 12 as well. By retaining the bearing cups 20 on the trunnions 12 in this manner, there is generally no need for external straps or other devices to retain the bearing cups 31 on the trunnions 12 when shipping the cross member 10 for subsequent installation in a universal joint. Since there is a loose fit between the dust guards 31 and the bearing cups 20, the bearing cups 20 are free to rotate relative to the dust guards 31 without interference therewith, even after installation.

During operation of the universal joint, the seal assembly 25 prevents lubricant from flowing out of roller bearing region 15 towards the open end of the bearing cup 20a, and further resists the entry of contaminants into the roller bearing region 15. After a period of use, contaminants, such as dirt, dust, and other abrasive materials, will eventually work their way between the second contaminant sealing lip 30 and the cylindrical sealing surface 12c of the trunnion 12 and cause the second contaminant sealing lip 30 to wear. When the second contaminant sealing lip becomes worn, contaminants move past the lip towards the first contaminant sealing lip 29. The first contaminant sealing lip 29 resists the entry of these contaminants past the first lip 28 and into the roller bearing region. Eventually, the first contaminant sealing lip 29 will wear in a manner similar to the second contaminant sealing lip 30, and the contaminants will move past the first contaminant sealing lip 30. However, the useful life of the seal assembly 25, as well as of the universal joint as a whole, is significantly extended. Therefore, the combination of the first and second contaminant sealing lips 29 and 30 extends the life of the universal joint by extending the time that the contaminants are prevented from entering the roller bearing region.

Figure 4:
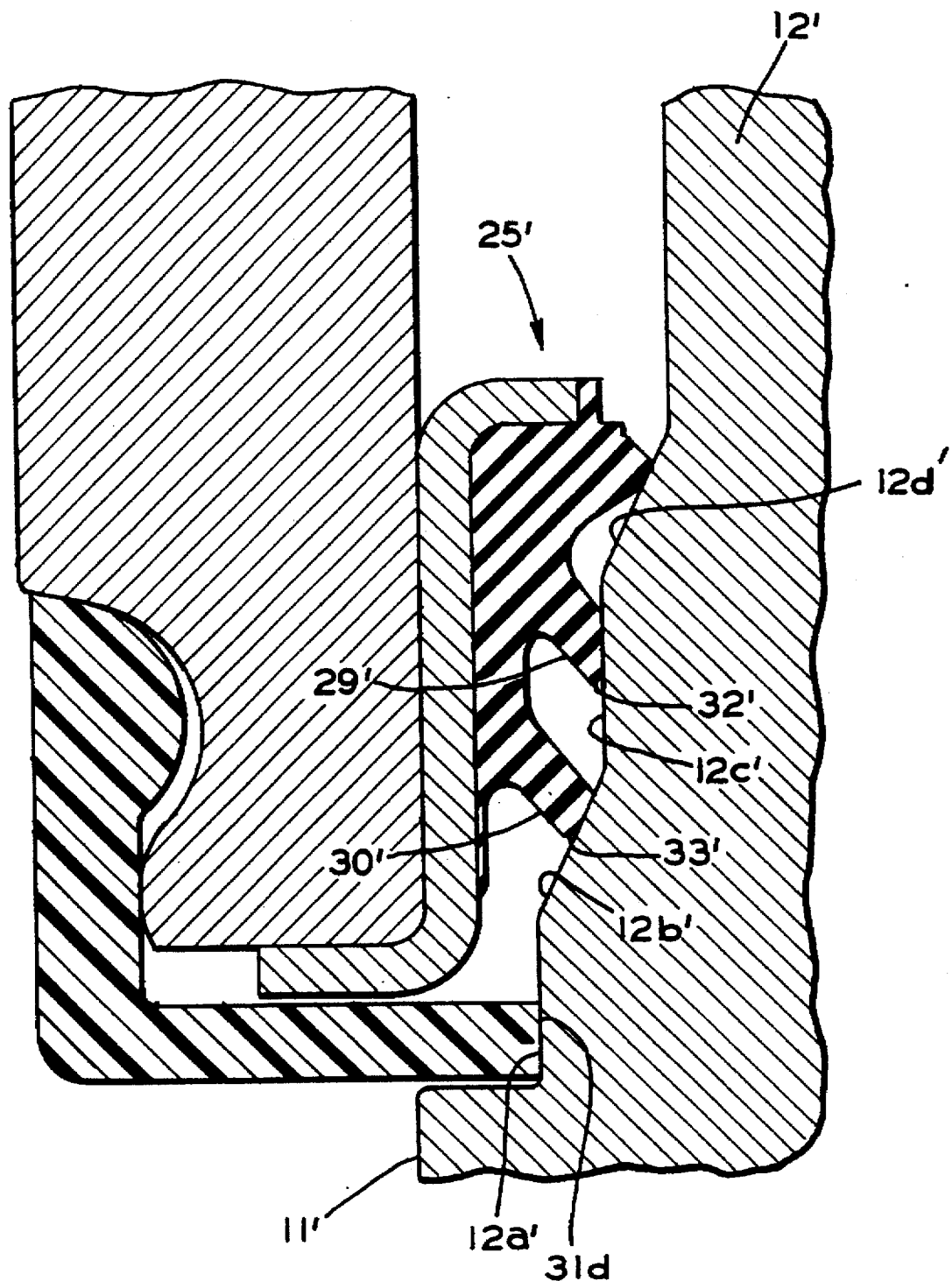
FIG. 4 is a sectional elevational view similar to FIG. 3 illustrating a second embodiment of a lip seal in accordance with this invention.

Referring now to FIG. 4, an alternate embodiment of the seal assembly 25' is shown. A cross member (not shown) has a body portion 11' and four trunnions 12', one of which is shown, arranged in a similar manner as described above. The trunnion 12' includes an extended first frustoconical sealing surface 12b' extending axially outwardly from the cylindrical friction surface 12a', a cylindrical sealing surface 12c' extending outwardly from the first frustoconical sealing surface 12b', and a second frustoconical sealing surface 12d' extending outwardly from the cylindrical portion 12c'. The second contaminant sealing lip 30' sealingly engages the first frustoconical sealing surface 12b', while the first contaminant sealing lip 29' sealingly engages the cylindrical sealing surface 12c'. The first and second contaminant sealing lips 29' and 30' terminate in ends 32' and 33' respectively. The inner annular diameters of the first and second contaminant sealing lip ends 32' and 33' in this embodiment are preferably not equal. Rather, the inner diameter defined by the first contaminant sealing lip end 32' is less than the inner diameter defined by the second contaminant sealing lip end 30b'. The seal assembly 25' operates similarly to the seal assembly 25 described above.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A cross member for a universal joint comprising:

a body portion having at least one trunnion extending outwardly from said body portion, said trunnion including a sealing surface extending outwardly from said body portion and a bearing surface extending outwardly from said sealing surface;

a bearing cup having an open end, a closed end, and an inner bearing surface, said bearing cup being disposed about said trunnion such that said inner bearing surface of said bearing cup is disposed co-axially about said bearing surface of said trunnion defining a bearing region therebetween;

a bearing disposed within said bearing region for permitting rotation of said bearing cup relative to said trunnion; and a seal assembly sealingly connected to said bearing cup for preventing the flow of lubricant out of said bearing region between said seal assembly and said bearing cup, said seal assembly including a lubricant sealing lip sealingly engaging said trunnion sealing surface and oriented at an angle toward said bearing region to resist the flow of lubricant out of said bearing region between said seal assembly and said trunnion, a first contaminant sealing lip engaging said trunnion sealing surface and oriented at an angle toward said open end of said bearing cup to resist the passage of contaminants into said bearing region between said seal assembly and said trunnion, and a second contaminant sealing lip engaging said trunnion sealing surface and oriented at an angle toward said open end of said bearing cup to resist the passage of contaminants into said bearing region between said seal assembly and said trunnion.

2. The cross member defined in claim 1 wherein said trunnion sealing surface includes a cylindrical portion extending outwardly from said body portion and a frustoconical portion extending outwardly from said cylindrical portion.

3. The cross member defined in claim 2 wherein said first and second contaminant sealing lips engage said cylindrical portion of said trunnion sealing surface and said lubricant sealing lip engages said frustoconical portion of said trunnion sealing surface.

4. The cross member defined in claim 1 wherein said trunnion sealing surface includes a first frustoconical portion extending outwardly from said body portion, a cylindrical portion extending outwardly from said first frustoconical portion, and a second frustoconical portion extending outwardly from said cylindrical portion.

5. The cross member defined in claim 4 wherein said first and second contaminant sealing lips engage said cylindrical portion of said trunnion sealing surface and said lubricant sealing lip engages said second frustoconical portion of said trunnion sealing surface.

6. The cross member defined in claim 4 wherein said first contaminant sealing lip engages said first frustoconical portion of said trunnion sealing surface, said second contaminant sealing lip engages said cylindrical portion of said trunnion sealing surface, and said lubricant sealing lip engages said second frustoconical portion of said trunnion sealing surface.

7. The cross member defined in claim 1 wherein said lubricant sealing lip extends at an acute angle relative to said trunnion sealing surface.

8. The cross member defined in claim 1 wherein said first and second contaminant sealing lips extend at an acute angle relative to said trunnion sealing surface.

9. The cross member defined in claim 1 wherein said seal assembly is mounted on a support ring sealingly connected to said bearing cup.

10. The cross member defined in claim 9 wherein said support ring is press fit within said open end of said bearing cup.

11. The cross member defined in claim 9 wherein said support ring is an annular metallic member.

12. The cross member defined in claim 9 wherein said support ring is generally S-shaped in cross section.

13. The cross member defined in claim 1 wherein said trunnion further includes a friction surface extending from said body portion to said sealing surface.

14. The cross member defined in claim 13 further including a dust guard connected to said bearing cup and frictionally engaging said trunnion friction surface.

15. The cross member defined in claim 1 wherein said first and second contaminant sealing lips terminate in first and second ends, respectively, which define inner diameters that are approximately equal.

16. A cross member for a universal joint comprising:
a body portion having a plurality of trunnions extending outwardly from said body portion, each of said trunnions including a sealing surface extending outwardly from said body portion and a bearing surface extending outwardly from said sealing surface;
a bearing cup disposed about each of said trunnions, each of said bearing cups having an open end, a closed end, and an inner bearing surface, said inner bearing surfaces of said bearing cups being disposed co-axially about said bearing surfaces of said trunnions defining respective bearing regions therebetween;
a bearing disposed within each of said bearing regions for permitting rotation of said bearing cups relative to said trunnions; and
a seal assembly sealingly connected to each of said bearing cups for preventing the flow of lubricant out of said bearing regions between said seal assemblies and said bearing cups, each of said seal assemblies including a lubricant sealing lip sealingly engaging said trunnion sealing surface and oriented at an angle toward said bearing region to resist the flow of lubricant out of said bearing region between said seal assembly and said trunnion, a first contaminant sealing lip engaging said trunnion sealing surface and oriented at an angle toward said open end of said bearing cup to resist the passage of contaminants into said bearing region between said seal assembly and said trunnion, and a second contaminant sealing lip engaging said trunnion sealing surface and oriented at an angle toward said open end of said bearing cup to resist the passage of contaminants into said bearing region between said seal assembly and said trunnion.

17. The cross member defined in claim 16 wherein each of said trunnion sealing surfaces includes a cylindrical portion extending outwardly from said body portion and a frustoconical portion extending outwardly from said cylindrical portion, and wherein said first and second contaminant sealing lips engage said cylindrical portions of said trunnion sealing surfaces and said lubricant sealing lips engage said frustoconical portions of said trunnion sealing surfaces.

18. The cross member defined in claim 16 wherein each of said trunnion sealing surfaces includes a first frustoconical portion extending outwardly from said body portion, a cylindrical portion extending outwardly from said first frustoconical portion, and a second frustoconical portion extending outwardly from said cylindrical portion, and wherein said first and second contaminant sealing lips engage said cylindrical portions of said trunnion sealing surfaces and said lubricant sealing lips engage said frustoconical portions of said trunnion sealing surfaces.

19. The cross member defined in claim 16 wherein each of said trunnions sealing surfaces includes a first frustoconical portion extending outwardly from said body portion, a cylindrical portion extending outwardly from said first frustoconical portion, and a second frustoconical portion extending outwardly from said cylindrical portion, and wherein said first contaminant sealing lips engage said first frustoconical portions of said trunnion sealing surfaces, said second contaminant sealing lips engage said cylindrical portions of said trunnion sealing surfaces, and said lubricant sealing lips engage said second frustoconical portions of said trunnion sealing surfaces.

20. The cross member defined in claim 16 wherein each of said trunnions further includes a friction surface extending from said body portion to said sealing surface, and further including a dust guard connected to each of said bearing cups, said dust guards frictionally engaging said trunnion friction surfaces.

* * * * *